(12) United States Patent
Green

(10) Patent No.: US 10,832,165 B2
(45) Date of Patent: Nov. 10, 2020

(54) SYSTEMS AND METHODS FOR ONLINE DISTRIBUTED EMBEDDING SERVICES

(71) Applicant: Facebook, Inc., Menlo Park, CA (US)

(72) Inventor: Bradley Ray Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 709 days.

(21) Appl. No.: 15/368,497

(22) Filed: Dec. 2, 2016

(65) Prior Publication Data
US 2018/0157989 A1   Jun. 7, 2018

(51) Int. Cl.
*G06N 20/00*   (2019.01)

(52) U.S. Cl.
CPC .................... *G06N 20/00* (2019.01)

(58) Field of Classification Search
CPC ...................................................... G06N 20/00
USPC .......................................................... 706/12
See application file for complete search history.

(56) References Cited

U.S. PATENT DOCUMENTS

| 8,706,655 | B1 * | 4/2014 | Rangarajan | G06Q 30/0282 706/12 |
| 2012/0150532 | A1 * | 6/2012 | Mirowski | G06F 40/40 704/9 |
| 2015/0095017 | A1 * | 4/2015 | Mnih | G06N 3/0472 704/9 |
| 2017/0061294 | A1 * | 3/2017 | Weston | G06F 16/334 |

* cited by examiner

*Primary Examiner* — Hien D Khuu
(74) *Attorney, Agent, or Firm* — Sheppard Mullin Richter & Hampton LLP

(57) ABSTRACT

Systems, methods, and non-transitory computer-readable media can receive JOINKEY information identifying a JOINKEY and embedding element information identifying a plurality of embedding elements associated with the JOIN-KEY. A training instance is created comprising a pre-determined number of embedding elements from the plurality of embedding elements. A plurality of negative samples from a sample cache are added to the training instance. One or more embeddings are updated based on the training instance.

19 Claims, 7 Drawing Sheets

500

Receive JOINKEY information identifying a JOINKEY, and embedding element information identifying a plurality of embedding elements associated with the JOINKEY
502

Create a training instance comprising a pre-determined number of embedding elements from the plurality of embedding elements
504

Adding a plurality of negative samples from a sample cache to the training instance
506

Update one or more embeddings based on the training instance
508

SYSTEMS AND METHODS FOR ONLINE DISTRIBUTED EMBEDDING SERVICES

FIELD OF THE INVENTION

The present technology relates to the field of embedding systems. More particularly, the present technology relates to systems and methods for providing an online distributed embedding service.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Data, such as data available to a social networking system, can be used to train machine learning models. Machine learning models can be useful in discovering patterns or drawing conclusions based on large amounts of data. For example, machine learning models can be used to automatically associate various entities, e.g., terms, concepts, things, or ideas, with one another. One class of systems used for training machine learning models are known as embedding systems. Embeddings are vector representations of entities in a latent space. An entity can be anything, e.g., a page, a person, a word, or a phrase, etc.

SUMMARY

Various embodiments of the present disclosure can include systems, methods, and non-transitory computer readable media configured to receive JOINKEY information identifying a JOINKEY and embedding element information identifying a plurality of embedding elements associated with the JOINKEY. A training instance is created comprising a pre-determined number of embedding elements from the plurality of embedding elements. A plurality of negative samples from a sample cache are added to the training instance. One or more embeddings are updated based on the training instance.

In an embodiment, the pre-determined number of embedding elements of the training instance comprise an item element and a plurality of context elements.

In an embodiment, the plurality of negative samples comprise a pre-determined number of negative samples, the pre-determined number of negative samples being determined based on the number of context elements.

In an embodiment, the plurality of context elements are written to the sample cache.

In an embodiment, the adding the plurality of negative samples from the sample cache to the training instance comprises selecting the plurality of negative samples from the sample cache by incrementing a read head of the sample cache by a prime, odd number.

In an embodiment, the writing the plurality of context elements to the sample cache comprises incrementing a write head of the sample cache by one after each write.

In an embodiment, it is determined that a training instance counter associated with the item element does not exceed a training instance threshold.

In an embodiment, the adding the plurality of negative samples and the updating one or more embeddings are performed based on the determining that the training instance counter does not exceed the training instance threshold.

In an embodiment, for each context element, a distance is calculated between a context element embedding associated with the context element and an item element embedding associated with the item element; and nearest neighbor information is updated for the item element embedding if the calculated distance is less than the distance for a current nearest neighbor.

In an embodiment, a degree of movement is calculated between a previous embedding associated with the item element and a current embedding associated with the item element. It is determined whether the degree of movement exceeds a movement threshold.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
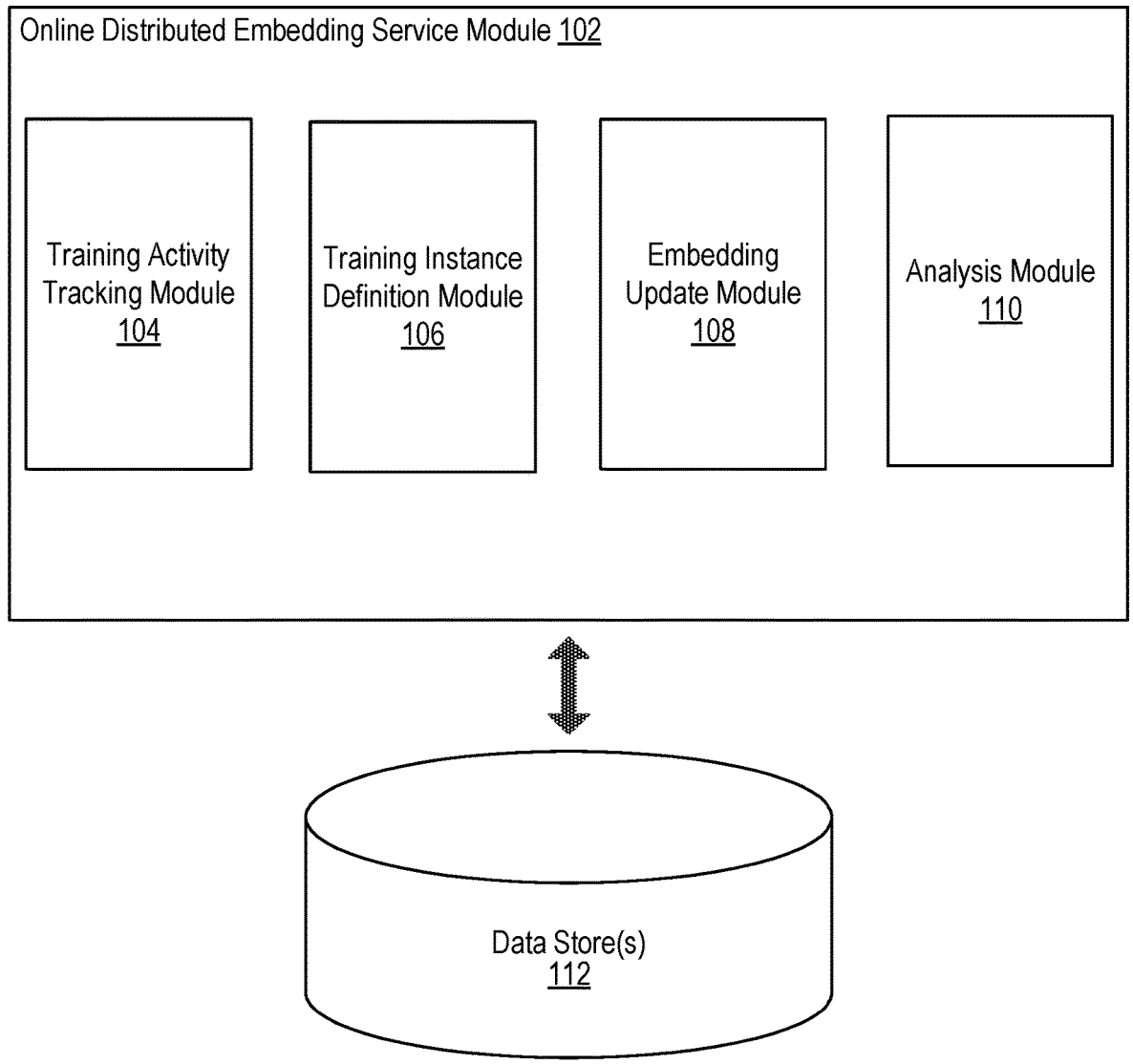
FIG. 1 illustrates an example system including an online distributed embedding service module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Online Distributed Embedding Services

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Data, such as data available to a social networking system, can be used to train machine learning models. Machine learning models can be useful in discovering patterns or drawing conclusions based on large amounts of data. For example, machine learning models can be used to automatically associate various entities, e.g., terms, concepts, things, or ideas, with one another. One class of systems used for training machine learning models is known as embedding systems. Embeddings are vector representations of entities in a latent space. An entity can be anything, e.g., a page, a person, a word, or a phrase, etc. A latent space is one that is discovered during training instead of labeled ahead of time. An embedding can be understood in some instances as a projection of the real world into the latent space. Some examples of training processes used in embedding systems include matrix factorization, skip-gram negative sampling, restricted Boltzmann machines (RBMs), and *-space.

Under conventional approaches, embedding systems learn in batch operations. Training data is present on a platform, and distributed to trainers in an iterative training process. At the end of this process, embeddings are produced and collected in a centralized store. However, there are a number of drawbacks to batch processing for the creation of embeddings. For example, training data must be available locally, and collection of large amounts of data into a single location can be costly. Furthermore, storing all training data in a single location tests the limits of data storage. Another drawback to batch training is that training can take a very long time for each batch. These long training durations are problematic because, during training, embeddings are not stable and, therefore, cannot be compared or used until training is completed. Embeddings between two batch runs are not comparable. A machine learning process using embeddings trained in the past cannot simply replace the data in situ. The entire machine learning process needs to be retrained to understand the current information encoding in the embeddings. Furthermore, the long time periods required for training also mean that embeddings can never be completely up-to-date, since the newest, most recent training data could not have been included in the last batch of training data.

Consider the example scenario of a social networking system that would like to create embeddings based on user engagement with posts on the social networking system. For example, the social networking system could have available to it information regarding which posts on the social networking system each user has interacted or engaged with. Such information could potentially be used, for example, to automatically determine what types of content each user would be most interested in. However, under conventional batch training operations, this would be essentially impossible. The amount of data required to be collected for such embeddings would be massive and could not reasonably be stored in a single location. Furthermore, even if such data could be collected in a single location, the training and creation of embeddings based on the collected data would take on the order of weeks to months, rendering the embeddings stale and irrelevant by the time they are available for use.

An improved approach rooted in computer technology overcomes the foregoing and other disadvantages associated with conventional approaches specifically arising in the realm of computer technology. In general, an online distributed embedding service can be used to create embeddings. In various embodiments, the embedding service can be distributed such that training of embeddings is distributed across multiple computing machines that are capable of cross-communicating with one another, e.g., able to perform writes and reads from one another. In various embodiments, for any specific embedding (e.g., identified by an item ID), training is frequently and incrementally occurring based on updated data as it becomes available in real-time. The embedding service can also be online such that even as embeddings are being incrementally trained and updated, embeddings are always available, e.g., always comparable. The online distributed embedding services described herein provide various advantages over conventional approaches. For example, training data does not have to be collected into a single location, and can be streamed in real-time. In another example, embedding activity can be tracked in real-time to see how embeddings are changing. An online embedding process provides iterative updates in a stable embedding space. Real-time tracking of embeddings as they are updated and changed also allows for conclusions to be drawn based on the velocity and acceleration of embedding changes. In yet another example, nearest neighbors for an embedding can be calculated and updated in real-time as embeddings are updated. Further details regarding online distributed embedding services will be disclosed herein.

FIG. 1 illustrates an example system 100 including an example online distributed embedding service module 102, according to an embodiment of the present disclosure. The online distributed embedding service module 102 can be configured to provide online distributed embedding services via an online distributed embedding system. In certain embodiments, an online distributed embedding system can be utilized to create embeddings in a latent space. Each embedding can be associated with and/or correspond to a particular entity. In various embodiments, the embedding service can be distributed such that training of embeddings is distributed across multiple machines that are capable of cross-communicating with one another, e.g., able to perform writes and reads from one another. In various embodiments, for any specific embedding (e.g., identified by an item ID), training is frequently and incrementally occurring based on updated data as it becomes available in real-time. The embedding service can also be online such that even as embeddings are being incrementally trained and updated, embeddings are always available, e.g., always comparable. For example, in certain embodiments, embeddings can be incrementally updated based on training instances which comprise a plurality of embedding elements. In certain embodiments, training instances can be defined as item-context pairs, which associate an item element with one or more context elements. Embeddings for the item element and the one or more context elements can be updated to move the embedding for each context element closer to the item element, and/or vice versa. In certain embodiments, the online distributed embedding system can be used to determine nearest neighbors in real-time. In certain embodiments, the online distributed embedding system can also be used to monitor and detect real-time drift or movement of embeddings based on the real-time updating of embeddings.

In certain embodiments, the online distributed embedded services and systems disclosed herein can be used to create embeddings based on social networking system data. For example, in various embodiments, embeddings can be created for users of the social networking system based on user post engagement information indicative of engagements by users with content posts on the social networking system. Unique features and elements of online distributed embedding systems will be described in greater detail below. Although various aspects of online distributed embedding systems may be discussed in the context of a system utilizing skip-gram negative sampling, it should be understood that the disclosed principles can be applied to any embedding process, such as matrix factorization, restricted Boltzmann machines, *-space, and the like.

As shown in the example of FIG. 1, the online distributed embedding service module 102 can include a training activity tracking module 102, a training instance definition module 106, an embedding update module 108, and an analysis module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the online distributed embedding service module 102 can be implemented in any suitable combinations.

In some embodiments, the online distributed embedding service module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the online distributed embedding service module 102 can be implemented, in part or in whole, as software running on one or more computing devices or systems, such as on a user or client computing device. For example, the online distributed embedding service module 102, or at least a portion thereof, can be implemented as or within an application (e.g., app), a program, or an applet, etc., running on a user computing device or a client computing system, such as the user device 610 of FIG. 6. In another example, the online distributed embedding service module 102, or at least a portion thereof, can be implemented using one or more computing devices or systems that include one or more servers, such as network servers or cloud servers. In some instances, the online distributed embedding service module 102 can, in part or in whole, be implemented within or configured to operate in conjunction with a social networking system (or service), such as the social networking system 630 of FIG. 6. It should be understood that there can be many variations or other possibilities.

The online distributed embedding service module 102 can be configured to communicate and/or operate with the at least one data store 112, as shown in the example system 100. The data store 112 can be configured to store and maintain various types of data. In some implementations, the data store 112 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 112 can store information that is utilized by the online distributed embedding service module 102. For example, the data store 112 can store past and present embeddings, training data, online data, training algorithms, one or more sample caches, and the like. It is contemplated that there can be many variations or other possibilities.

The training activity tracking module 104 can be configured to receive, interpret, and/or potentially augment activity information that may be used in training and/or updating embeddings. For example, in the context of a social networking system, the training activity tracking module 104 can be configured to receive social networking system information that may be used in updating embeddings. Although various examples will be discussed below in the context of a social networking system, it should be understood that online distributed embedding services disclosed herein can be applied generally to any source of data or information. The training activity tracking module 104 can include one or more "tailers" that are configured to receive particular types of information. For example, a social networking system may have one or more scribe logs that track information pertaining to hashtag usage, content posts, user engagement, searches, page visitation, page fanning, page engagement, etc. The social networking system can include one tailer for each scribe log, such that each tailer is tasked with receiving and interpreting one type of information (e.g., hashtag information, search information, content post information, post engagement information, etc.).

The training activity tracking module 104 can be configured to receive activity information, and to determine a JOINKEY and an item type that will be trained on. The JOINKEY can be a characteristic or an entity or element based upon which various embedding elements can be grouped. For example, a JOINKEY can be a Post ID identifying a social networking system post. Users (who may be identified by user ID) can be classified or grouped together based on engagement with the same post (identified by Post ID). In other words, embeddings for each user can be moved slightly closer to one another, indicating an increased similarity or relationship between the users, based on the fact that each user has engaged with the same post. In another example, a JOINKEY can be a Page ID, and users that fan a page can be grouped together based on that commonality. In yet another example, a hashtag can be a JOINKEY, and content posts can be grouped together based on a common hashtag. The training activity tracking module 104 can be pre-configured with one or more JOINKEYS and one or more item types for which embeddings are being created. The training activity tracking module 104 can transmit JOINKEY information and embedding element information to the training instance definition module 106 for creation of training instances.

The training instance definition module 106 can be configured to create training instances for updating embeddings based on activity information received from the training activity tracking module 104. The training instance definition module 106 can also be referred to as a "joiner," as the primary objective of the training instance definition module 106 is to group embedding elements into training instances. In certain embodiments, the training activity tracking module 104 can send an API call to the training instance definition module 106. The API call can include activity information, which can include JOINKEY information identifying a JOINKEY and embedding element information identifying a plurality of embedding elements. For example, the JOINKEY information can include a post ID associated with a post on a social networking system. The embedding element information can include one or more user IDs for which embeddings will be created and/or updated based on the post ID. In other words, a particular post ID can be used to create and/or update embeddings for users. For example, embeddings for users that engage with the same content post on the social networking system may be moved closer to one another. In this example, the training instance definition module 106 can receive from the training activity tracking module 104 a post ID as the JOINKEY, and can also receive as embedding element information one or more user IDs that are associated with the post ID, e.g., identifying one or more users that have interacted with the post. In another example, if the JOINKEY information includes a hashtag, the embedding element information can identify every content post (e.g., a list of post IDs) that includes the hashtag.

In certain embodiments, a training instance can be made up of an item-context pair. Training instances can be defined using the JOINKEY information and the embedding element information. For each JOINKEY, the training instance definition module 106 can group together pre-defined numbers of embedding elements that are identified by the embedding element information. For example, if the JOINKEY is a post ID, the embedding elements are user IDs (e.g., user IDs that have engaged with the post identified by the post ID), and the pre-determined number of embedding elements is set to five, groups of five user IDs associated with the JOINKEY can be grouped into a training instance. In each training instance, one embedding element can be labeled as the item element and the remaining embedding elements can be labeled as context elements. For example, if the training instance definition module 106 receives user IDs in the order of engagement with the post ID, for each grouping of five user IDs, the middle user ID can be labeled as the item element, and the other four user IDs can be labeled as context elements. In this way, an item-context pair, i.e., a training instance, can be defined. Although training instances will often be described as an "item-context pair," it should be understood that the context portion of the pairing can include more than one embedding element. In the example described above, each item-context pair would include one item element, and four context elements. Training instances can be sent to the embedding update module 108 for updating embeddings based on training instances.

The embedding update module 108 can be configured to create and/or update embeddings based on training instances. In certain embodiments, the training instance definition module 106 can send an API call including a training instance to the embedding update module 108. The embedding update module 108 can take a training step using each training instance, e.g., item-context pair, received. The training process or algorithm used by the embedding system is applied to the item-context pair to update embeddings. The embedding of each context element is moved closer to the embedding of the item element. In this way, the embedding of the item element is being "pushed" onto the embedding for each context element. The embedding update module 108 is described in greater detail herein.

The analysis module 110 can be configured to perform various analysis functions based on updated embeddings. For example, the analysis module 110 can be configured to perform nearest neighbor calculations based on real-time embeddings, or to monitor and detect drift and/or movement of embeddings based on updating of embeddings. The analysis module 110 is described in greater detail herein.

Figure 2:
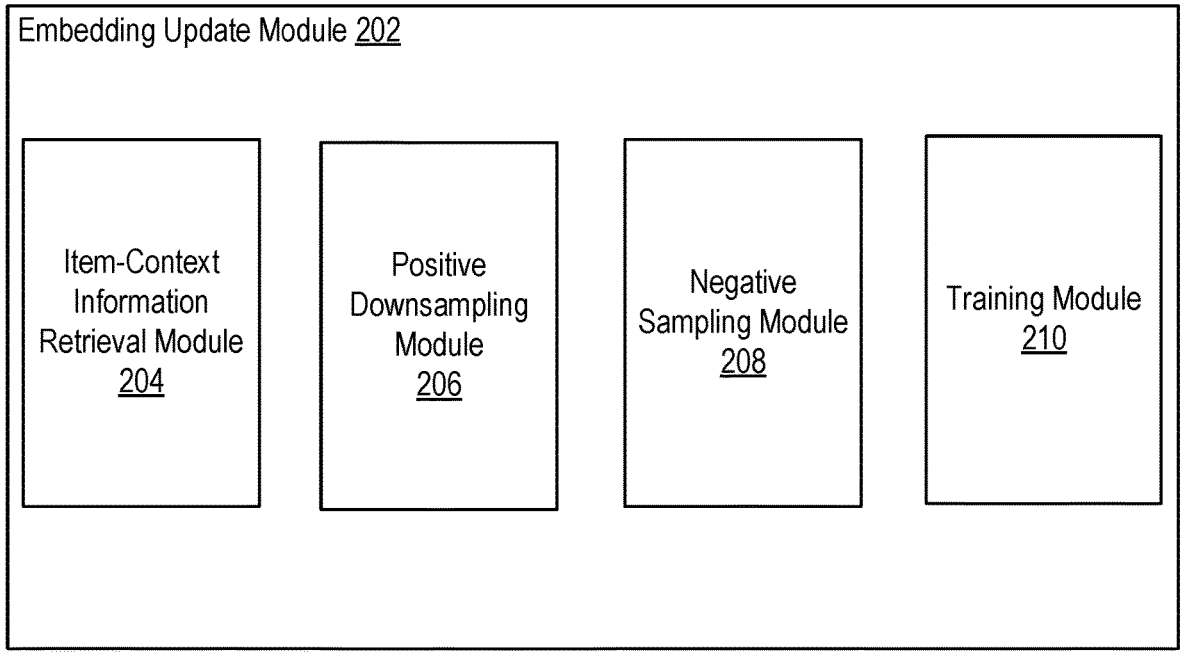
FIG. 2 illustrates an example embedding update module, according to various embodiments of the present disclosure.

FIG. 2 illustrates an example embedding update module 202 configured to update embeddings based on training instances, according to an embodiment of the present disclosure. In some embodiments, the embedding update module 108 of FIG. 1 can be implemented as the embedding update module 202. As shown in the example of FIG. 2, the embedding update module 202 can include an item-context information retrieval module 204, a positive downsampling module 206, a negative sampling module 208, and a training module 210.

The item-context information retrieval module 204 can be configured to retrieve information associated with a training instance. In certain embodiments, a particular computing machine in the embedding system can receive a training call, i.e., an API call including a training instance. However, information relevant to the training call may be distributed across multiple computing machines in the embedding system. The item-context information retrieval module 204 can be configured to retrieve information for the training instance from multiple computing machines in the embedding system. As discussed above, a training instance can include an item-context pair comprising an item element and one or more context elements.

For the item element, the item-context information retrieval module 204 can be configured to retrieve the item element's embedding, training data associated with the item element, and online data associated with the item element. Training data associated with the item element can include any information required by a particular training algorithm or process for updating the item element's embedding. As such, the particular training data required can vary based on what training algorithm or process is used by the embedding system (e.g., skip-gram negative sampling, *-space, etc.). Online data associated with the item element can include the number of training instances that have occurred for the item element, nearest neighbor information for the item element (e.g., item IDs and distances from the item element embedding for each nearest neighbor of the item element), and other information that may be of interest (e.g., the most recent previous embedding for the item element or multiple previous embeddings for the item element).

For each context element, the item-context information retrieval module 204 can be configured to retrieve the context element's embedding, and training data for the context element. Again, as with the item training data, the training data for each context element may be defined by the training algorithm or process used in the embedding system.

The positive downsampling module 206 can be configured to determine whether or not a training instance will be useful for updating embeddings, i.e., to make a usefulness determination for each training instance. Unhelpful training instances can be skipped, i.e., if a training instance is determined to be unhelpful, that training instance will not be used for updating embeddings. For example, certain embedding elements that come up too frequently may not be useful in updating embeddings. An example of this includes the terms "the" or "I" when embedding language. These terms occur too frequently to be useful in determining terms that are related to one another. In another example, certain pages or posts on a social networking system are so universally liked or engaged with by users of the social networking system that engagement information for these pages or posts is not useful for classifying users into groups. In certain embodiments, a usefulness determination can be made for each training instance, i.e., each item-context pairing, by comparing the number of times the item element has been included in a training instance and a total number of training instances that have occurred in the embedding system. The number of times an item element has been included in a training instance can be tracked using a training instance counter associated with the item element. For example, every time an item element is included in a training instance, or each time a training instance that includes the item element is used to update embeddings, the training instance counter associated with the item element can be incremented. The total number of training instances that have occurred on the embedding system can be tracked or estimated. For example, in certain embodiments, it can be estimated how many training instances occur every second in the embedding system (e.g., 2000 trainings/second*3 shards in the system=6000 trainings/second being performed by the system) and extrapolated over a period of time to determine a total number of training instances. In various embodiments, these values, i.e., the training instance counter for the item element and the total number of training instances on the embedding system, can be determined for all time, or for a pre-determined period of time. If the training instance counter for the item element exceeds a particular training instance threshold, the training instance can be excluded, and the training instance will not be used for updating embeddings. In certain embodiments, the training instance threshold can be defined as a percentage or fraction of the total number of training instances performed by the system, e.g., 1/1024 of all training instances. In certain embodiments, if the number of training instances including the item element exceeds the training instance threshold, rather than automatically removing the training instance, the training instance may have a non-zero probability of being skipped.

The negative sampling module 208 can be configured to select one or more negative samples for addition to the training instance. Negative sampling forces dissimilar entities from having dissimilar embeddings. Negative sampling prevents the tendency for all entities to converge to the same embedding. In certain embodiments, a local sample cache can be used for selecting negative samples to include in the training instance. The local sample cache can be a memory bounded rotating array. The local sample cache can include a read head and a write head that operate independently. The local sample cache can be read from non-linearly, to simulate sample distributions different from the training distribution.

The negative sampling module 208 can select a pre-determined number of negative samples from the local sample cache for inclusion in the training instance. In certain embodiments, the pre-determined number of negative sample can be determined based on the number of context elements in the training instance. For example, the number of negative samples can be a multiple of the number of context elements in the training instance, e.g., four times the number of context elements.

The negative sampling module 208 can also be configured to write the context elements in the current training instance into the local sample cache. By writing the current context elements into the local sample cache, the contents of the local sample cache are constantly being updated, and the current set of context elements can be used as negative samples in future training instances.

In certain embodiments, context elements in the current training instance can be written to the local sample cache by replacing the current write head location with a context element, incrementing the write head by one, replacing the next write head location with the next context element, and so forth. In certain embodiments, the negative samples can be selected from the local sample cache by incrementing the read head by an odd prime number until the pre-defined number of negative samples are collected. By incrementing the write head by one and incrementing the read head by an odd prime number, it can be ensured that the negative samples selected for the current training instance will not be a collection of related context elements from a previous training instance, and will be a random, unrelated set of negative samples.

Once a set of negative samples is determined for the training instance, the negative sample module 208 can be configured to retrieve data associated with each negative sample. In certain embodiments, the negative sampling module 208 can retrieve the same information for each negative sample as was retrieved for each context element, i.e., the negative sample's embedding, and training data for each negative sample (determined by the training algorithm or process utilized by the embedding system).

The training module 210 can be configured to update embeddings based on a training instance. At this point, the training instance includes an item element, one or more context elements, and one or more negative samples. Information has also been gathered for each element in the training instance, e.g., item element embedding, item training data, item online data, embeddings and training data for each context element, and embeddings and training data for each negative sample. Embeddings are updated based on the training instance and the information collected relating to the training instance and based on the training process or algorithm utilized by the embedding system. The end result is that for every element in the training instance, i.e., the item element, the context elements, and the negative samples, the embeddings have changed, and the training data associated with each element has changed. A training instance counter associated with the item element (and/or each context element) can be incremented to keep an up-to-date count of the number of times in which the item element (or context element) has been included in a training instance. Additionally, any updated data can be written back to the various computing machines on the embedding system. For example, any embeddings that have been updated can be written to the various computing machines to replace previous embeddings, and any training data that has been updated can be written to the various computing machines to replace previous training data.

Periodically, the data required for training of an item element can be written to network storage to provide fault tolerance for the embedding system. This can be done at a rate proportional to the number of training iterations an item element has seem, e.g., every 2^16 training iterations. If the embedding system faults, when it is brought back online, the last known "good" data can be loaded from network storage.

Figure 3:
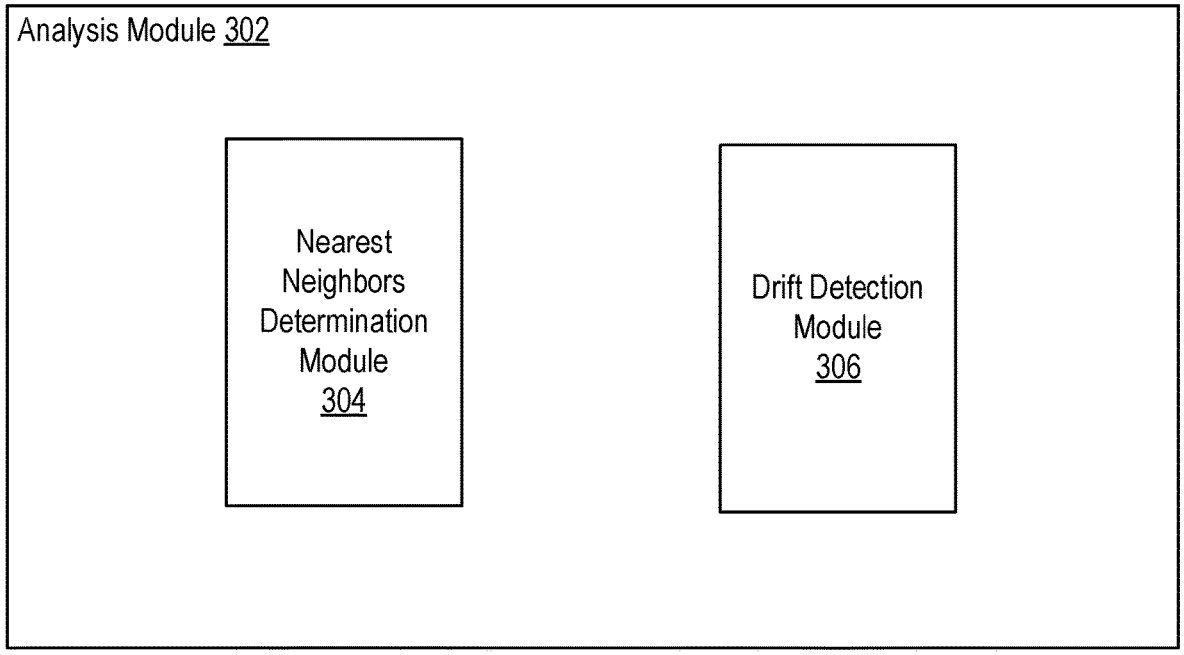
FIG. 3 illustrates an example analysis module, according to an embodiment of the present disclosure.

FIG. 3 illustrates an example analysis module 302 configured to perform various analyses based on updated embeddings, according to an embodiment of the present disclosure. In some embodiments, the analysis module 110 of FIG. 1 can be implemented as the analysis module 302. As shown in the example of FIG. 3, the analysis module 302 can include a nearest neighbors determination module 304 and a drift detection module 306.

The nearest neighbors determination module 304 can be configured to update nearest neighbor information for an item element of a training instance. Conventional systems generally determined nearest neighbors by comparing each embedding to all other embeddings in the system to find nearest neighbors. In the presently disclosed systems and methods, embeddings are incrementally updated using training instances and are online. As such, nearest neighbors can be determined directly with minimal calculation. For example, when a training instance is applied to update embeddings, as described above, the item element can have associated with it nearest neighbor information identifying one or more nearest neighbors and the distance of each nearest neighbor to the item element. Once embeddings are completed, distances can be calculated from each context element in the training instance to the item element. If the distances for any context elements are smaller than a current nearest neighbor, that nearest neighbor can be replaced with a closer context element.

This system recognizes item elements that appear within the context of a training instance. However, this may not provide a mechanism for recognizing when a non-context element embedding drifts away from an item element. To address this possibility, the distances of stored nearest neighbors can be periodically recalculated. In certain embodiments, this can be done at a rate proportional to the number of training iterations an item element has seen, e.g., every 2^16 training iterations that include the item element.

The drift detection module 306 can be configured to detect drift or movement in embeddings as embeddings are updated. In certain embodiments, previous embedding information can be retrieved for the item element in a training instance. The new embedding that is determined for the item element based on the current training instance can be compared to the previous embedding(s) to determine a degree of movement of the item element's embedding. If the degree of movement surpasses a movement threshold, e.g., movement of more than 15%, a movement log or trend log may be updated based on the movement of the item element embedding. This feature may be used to identify trending topics on a social networking system. For example, if an embedding moves by more than a threshold amount, it may be flagged as a potential trending topic.

The presently disclosed systems and methods provide numerous advantages over conventional systems and methods. For example, in the context of a social networking system, the presently disclosed inventions may allow for embedding of pages based on page visits. Users of social networking system may have fanned billions of pages on the social networking system. Collection of this data, sequencing, analyzing, and training based on this data could take weeks to months using conventional systems. However, using the currently disclosed systems and methods, page embeddings could be updated incrementally using training instances as described above, and page embeddings would always be online and available.

Similarly, effectively training embeddings for users based on social activity would be impossible using conventional approaches, as there would simply be too much data to perform batch training operations. However, the presently disclosed online distributed embedding systems and methods can make this task feasible by tailing engagements of users on stories. The engagements can be joined based on story ID, and training instances can include windows of users who engaged on a particular story. The result is embeddings for all users of the social networking system which encodes topic interest, social connections, and demographic data.

Furthermore, the online nature of the disclosed systems and methods allow for on-demand querying of the embedding system for use in other applications. For example, page recommendations or newsfeed story rankings can ask for current embeddings for any item element in near real-time. An API can be provided so that embeddings and nearest neighbors can be read from the embedding system for use in other systems, such as search and recommender systems. Even while an online distributed embedding system is training, it can respond to requests for near real-time embeddings and nearest neighbors.

Figure 4:
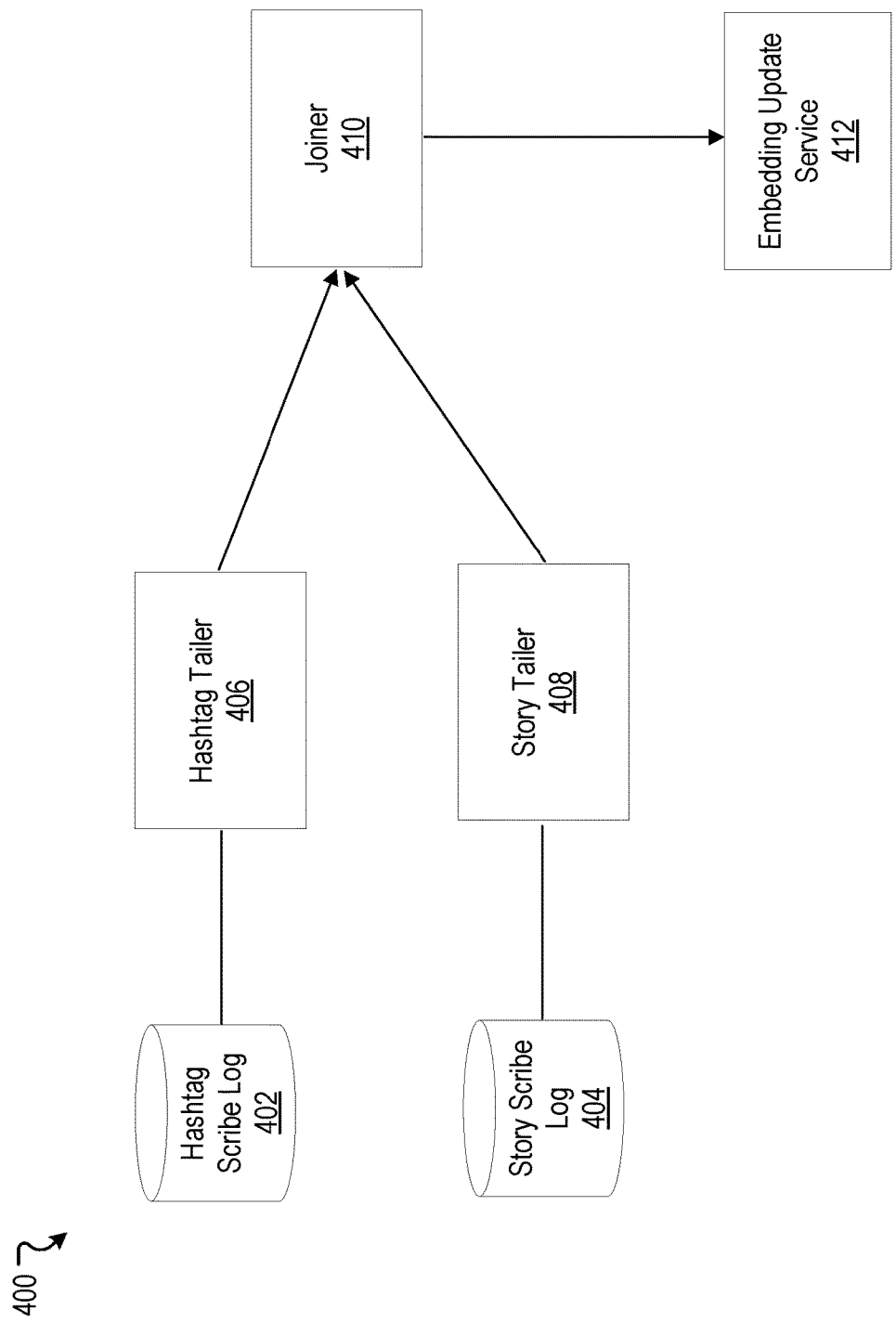
FIG. 4 illustrates an example system architecture for an online distributed embedding service, according to an embodiment of the present disclosure.

FIG. 4 illustrates an example system architecture 400 for an online distributed embedding service, according to an embodiment of the present disclosure. The example system architecture 400 includes a hashtag scribe log 402, a story scribe log 404, a hashtag tailer 406, and a story tailer 408. The hashtag tailer 406 can be configured to inspect the hashtag scribe log 402 to collect and retrieve hashtag activity information to be used in training and/or updating embeddings. Similarly, the story tailer 408 can be configured to inspect the story scribe log 404 to collect and retrieve story activity information to be used in training and/or updating embeddings.

Training activity information can be transmitted from the hashtag tailer 406 and the story tailer 408 to the joiner 410. The joiner 410 can be configured to use the training activity information to create training instances for updating embeddings. Training instances can then be transmitted to the embedding update service 412 for updating embeddings based on the training instances.

Figure 5:
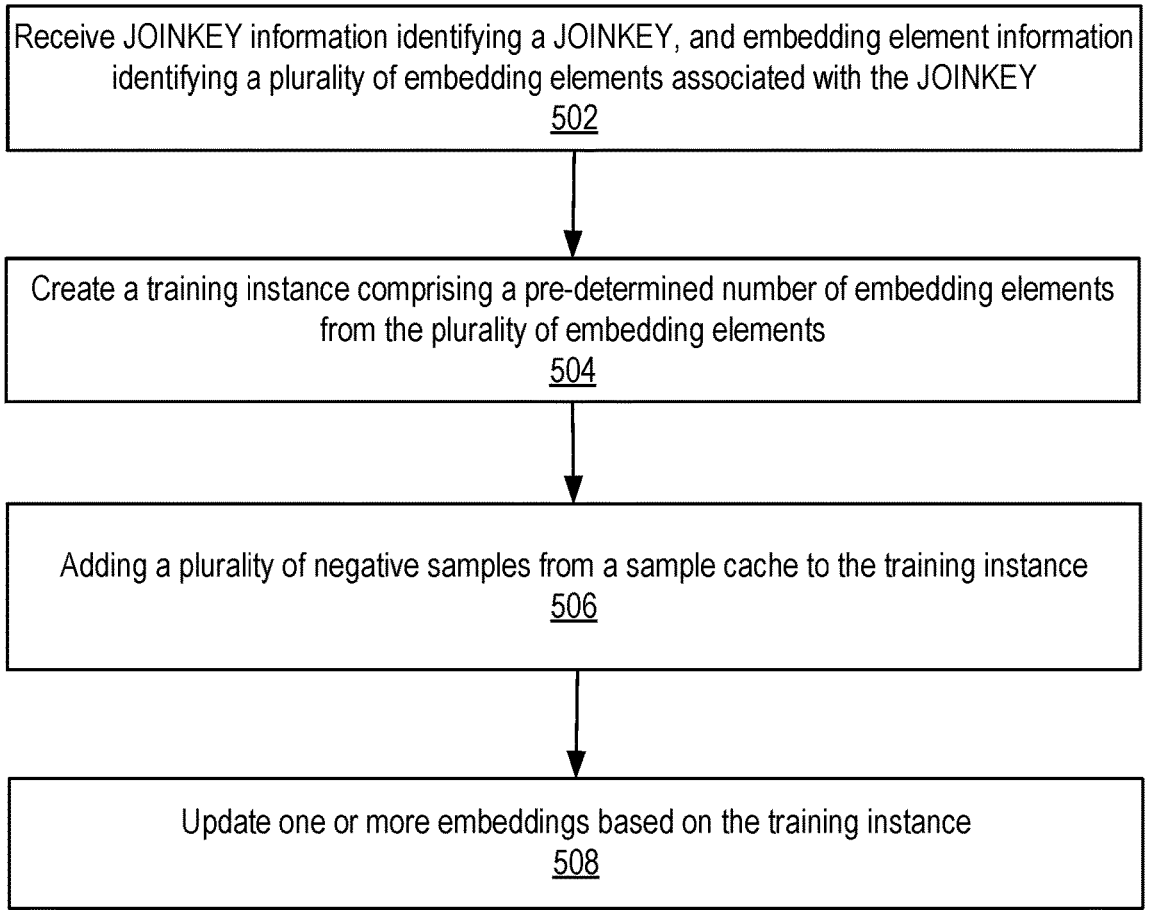
FIG. 5 illustrates an example method associated with updating embeddings, according to an embodiment of the present disclosure.

FIG. 5 illustrates an example method 500 associated with updating embeddings, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive JOINKEY information identifying a JOINKEY, and embedding element information identifying a plurality of embedding elements associated with the JOINKEY. At block 504, the example method 500 can create a training instance comprising a pre-determined number of embedding elements from the plurality of embedding elements. At block 506, the example method 500 can add a plurality of negative samples from a local sample cache to the training instance. At block 508, the example method 500 can update one or more embeddings based on the training instance.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
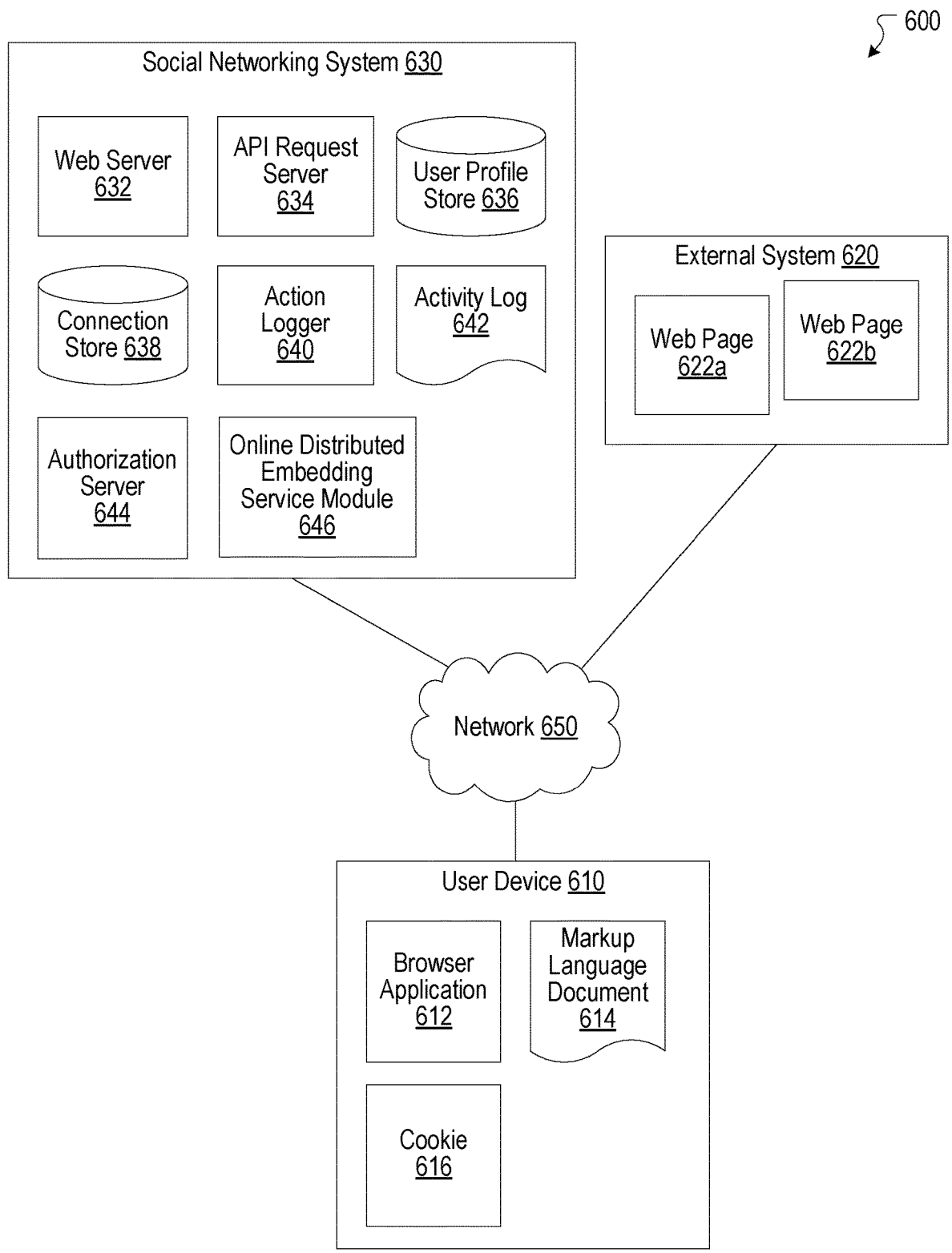
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an online distributed embedding service module 646. The online distributed embedding service module 646 can, for example, be implemented as the online distributed embedding service module 102, as discussed in more detail herein. As discussed previously, it should be appreciated that there can be many variations or other possibilities. For example, in some embodiments, one or more functionalities of the online distributed embedding service module 646 can be implemented in the user device 610.

Hardware Implementation

Figure 7:
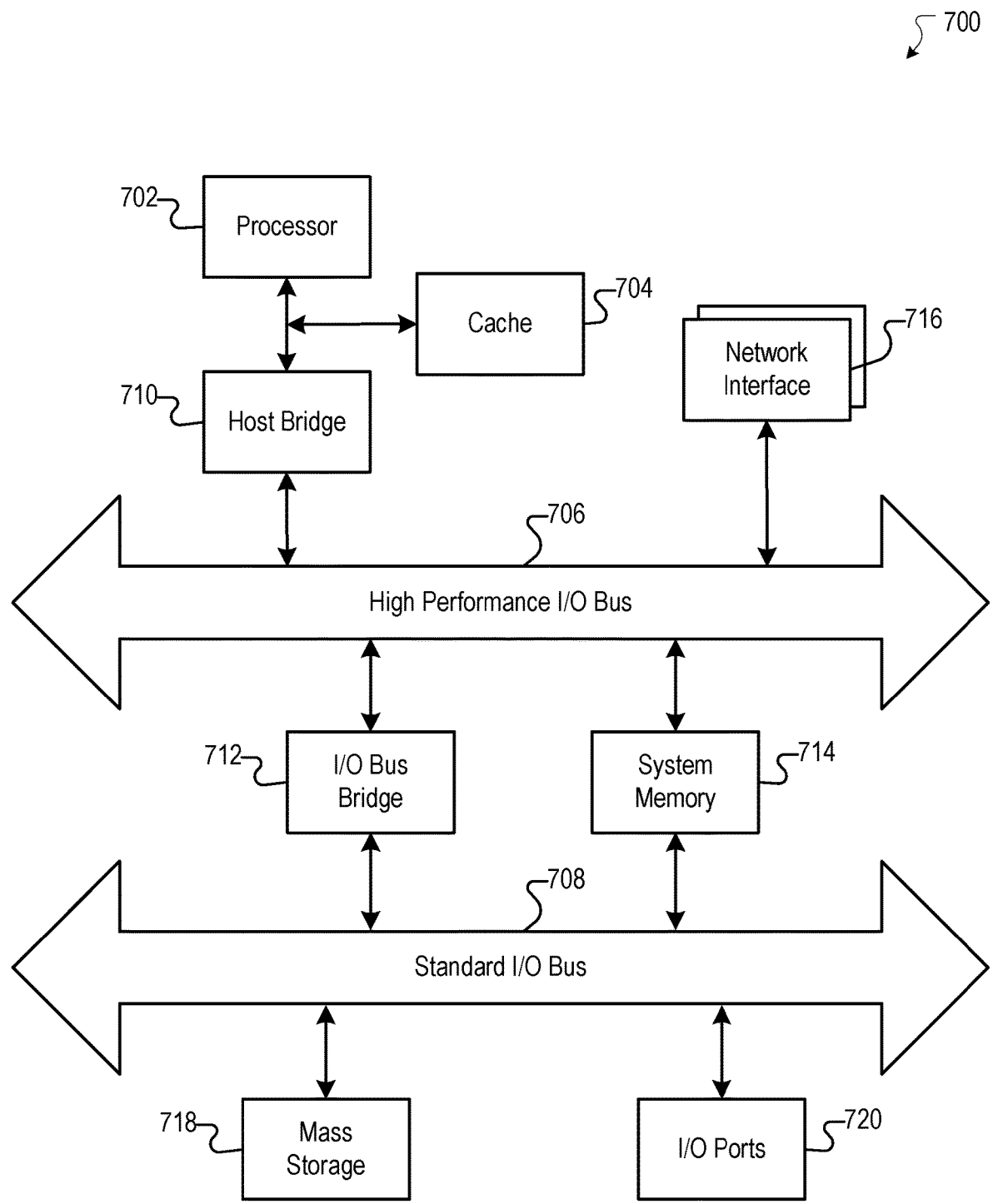
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, JOINKEY information identifying a JOINKEY and embedding element information identifying a plurality of embedding elements associated with the JOINKEY;
creating, by the computing system, a training instance comprising a pre-determined number of embedding elements from the plurality of embedding elements;
labeling, by the computing system, a first embedding element of the training instance as an item element, and one or more other embedding elements of the training instance as context elements;
adding, by the computing system, a plurality of negative samples from a sample cache to the training instance, wherein the plurality of negative samples comprises a pre-determined number of negative samples that are determined based on a number of context elements;
updating, by the computing system, one or more embeddings based on the training instance; and writing, by the computing system, the context elements in the training instance to the sample cache for potential selection as negative samples in future training instances.

2. The computer-implemented method of claim 1, wherein the training instance comprises a plurality of context elements.

3. The computer-implemented method of claim 2, further comprising determining that a training instance counter associated with the item element does not exceed a training instance threshold.

4. The computer-implemented method of claim 2, further comprising:
for each context element, calculating a distance between a context element embedding associated with the context element and an item element embedding associated with the item element; and
updating nearest neighbor information for the item element embedding if the calculated distance is less than a distance for a current nearest neighbor.

5. The computer-implemented method of claim 2, further comprising:
calculating a degree of movement between a previous item element embedding and a current item element embedding; and
determining whether the degree of movement exceeds a movement threshold.

6. The computer-implemented method of claim 3, wherein the adding the plurality of negative samples and the updating one or more embeddings are performed based on the determining that the training instance counter does not exceed the training instance threshold.

7. The computer-implemented method of claim 1, wherein the adding the plurality of negative samples from the sample cache to the training instance comprises:
selecting the plurality of negative samples from the sample cache by incrementing a read head of the sample cache by a prime, odd number.

8. The computer-implemented method of claim 1, wherein the writing the context elements in the training instance to the sample cache comprises:
incrementing a write head of the sample cache by one after each write.

9. A system comprising:
at least one processor; and
a memory storing instructions that, when executed by the at least one processor, cause the system to perform a method comprising:
receiving JOINKEY information identifying a JOINKEY and embedding element information identifying a plurality of embedding elements associated with the JOINKEY;
creating a training instance comprising a pre-determined number of embedding elements from the plurality of embedding elements;
labeling a first embedding element of the training instance as an item element, and one or more other embedding elements of the training instance as context elements;
adding a plurality of negative samples from a sample cache to the training instance, wherein the plurality of negative samples comprises a pre-determined number of negative samples that are determined based on a number of context elements;
updating one or more embeddings based on the training instance; and
writing the context elements in the training instance to the sample cache for potential selection as negative samples in future training instances.

10. The system of claim 9, wherein the training instance comprises a plurality of context elements.

11. The system of claim 10, further comprising determining that a training instance counter associated with the item element does not exceed a training instance threshold.

12. The system of claim 11, wherein the adding the plurality of negative samples and the updating one or more embeddings are performed based on the determining that the training instance counter does not exceed the training instance threshold.

13. The system of claim 9, wherein the adding the plurality of negative samples from the sample cache to the training instance comprises:
selecting the plurality of negative samples from the sample cache by incrementing a read head of the sample cache by a prime, odd number.

14. The system of claim 9, wherein the writing the context elements in the training instance to the sample cache comprises:
incrementing a write head of the sample cache by one after each write.

15. A non-transitory computer-readable storage medium including instructions that, when executed by at least one processor of a computing system, cause the computing system to perform a method comprising:
receiving JOINKEY information identifying a JOINKEY and embedding element information identifying a plurality of embedding elements associated with the JOINKEY;
creating a training instance comprising a pre-determined number of embedding elements from the plurality of embedding elements;
labeling a first embedding element of the training instance as an item element, and one or more other embedding elements of the training instance as context elements;
adding a plurality of negative samples from a sample cache to the training instance, wherein the plurality of negative samples comprises a pre-determined number of negative samples that are determined based on a number of context elements;
updating one or more embeddings based on the training instance; and
writing the context elements in the training instance to the sample cache for potential selection as negative samples in future training instances.

16. The non-transitory computer-readable storage medium of claim 15, wherein the training instance comprises a plurality of context elements.

17. The non-transitory computer-readable storage medium of claim 16, further comprising determining that a training instance counter associated with the item element does not exceed a training instance threshold.

18. The non-transitory computer-readable storage medium of claim 15, wherein the adding the plurality of negative samples from the sample cache to the training instance comprises:
selecting the plurality of negative samples from the sample cache by incrementing a read head of the sample cache by a prime, odd number.

19. The non-transitory computer-readable storage medium of claim 15, wherein the writing the context elements in the training instance to the sample cache comprises:

incrementing a write head of the sample cache by one after each write.

* * * * *